(12) United States Patent
Louh

(10) Patent No.: US 8,917,446 B1
(45) Date of Patent: Dec. 23, 2014

(54) DISPLAY DEVICE WITH PLURAL SCREENS

(71) Applicant: Hon Hai Precision Industry Co., Ltd., New Taipei (TW)

(72) Inventor: Sei-Ping Louh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/105,149

(22) Filed: Dec. 12, 2013

(30) Foreign Application Priority Data

Sep. 30, 2013 (TW) .............................. 102135428 U

(51) Int. Cl.
| G03B 21/56 | (2006.01) |
| G02B 27/02 | (2006.01) |
| G02B 3/08 | (2006.01) |
| G02B 3/00 | (2006.01) |

(52) U.S. Cl.
CPC ................ G02B 27/022 (2013.01); G02B 3/08 (2013.01); G02B 3/0056 (2013.01)
USPC ............................ 359/443; 359/619; 359/742

(58) Field of Classification Search
USPC .......................................................... 359/443
See application file for complete search history.

(56) References Cited

U.S. PATENT DOCUMENTS 8,472,114 B2 * 6/2013 Watanabe ..................... 359/443

* cited by examiner

*Primary Examiner* — James Jones
(74) *Attorney, Agent, or Firm* — Novak Druce Connolly Bove + Quigg LLP

(57) ABSTRACT

A display device with plural screens includes a plurality of display units arranged in matrix and at least one lens module. Each display unit includes a frame located at an outer periphery thereof. The connecting portions located at a crossing of four adjacent display units are substantially cruciform. The at least one lens module is arranged on the cruciform connecting portions. Each lens unit includes a first lens covering a side wall of a display unit, a second lens covering a side wall of an adjacent display unit, and a third lens connected to the first lens and the second lens. The light output surface of the first lens has a plurality of first sawtooth protrusions, the light output surface of the second lens has a plurality of second sawtooth protrusions, and the light output surface of the third lens has a plurality of third sawtooth protrusions.

9 Claims, 4 Drawing Sheets

DISPLAY DEVICE WITH PLURAL SCREENS

BACKGROUND

1. Technical Field

The disclosure relates to display devices, and particularly to a display device with plural screens.

2. Discussion of Related Art

A display device with plural screen generally includes a plurality of screens arranged in array. Each screen has a frame for supporting it on a wall. The frame located between two adjacent screens is directly visible from an outside environment; therefore, the picture of the display device is divided by the frame and becomes non-continuous, resulting in a poor picture quality of the display device.

Therefore, what is needed is a display device with plural screens which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present display device with plural screens. Moreover, in the drawing, like reference numerals designate corresponding parts throughout the whole view.

DETAILED DESCRIPTION OF EMBODIMENTS

Figure 1:
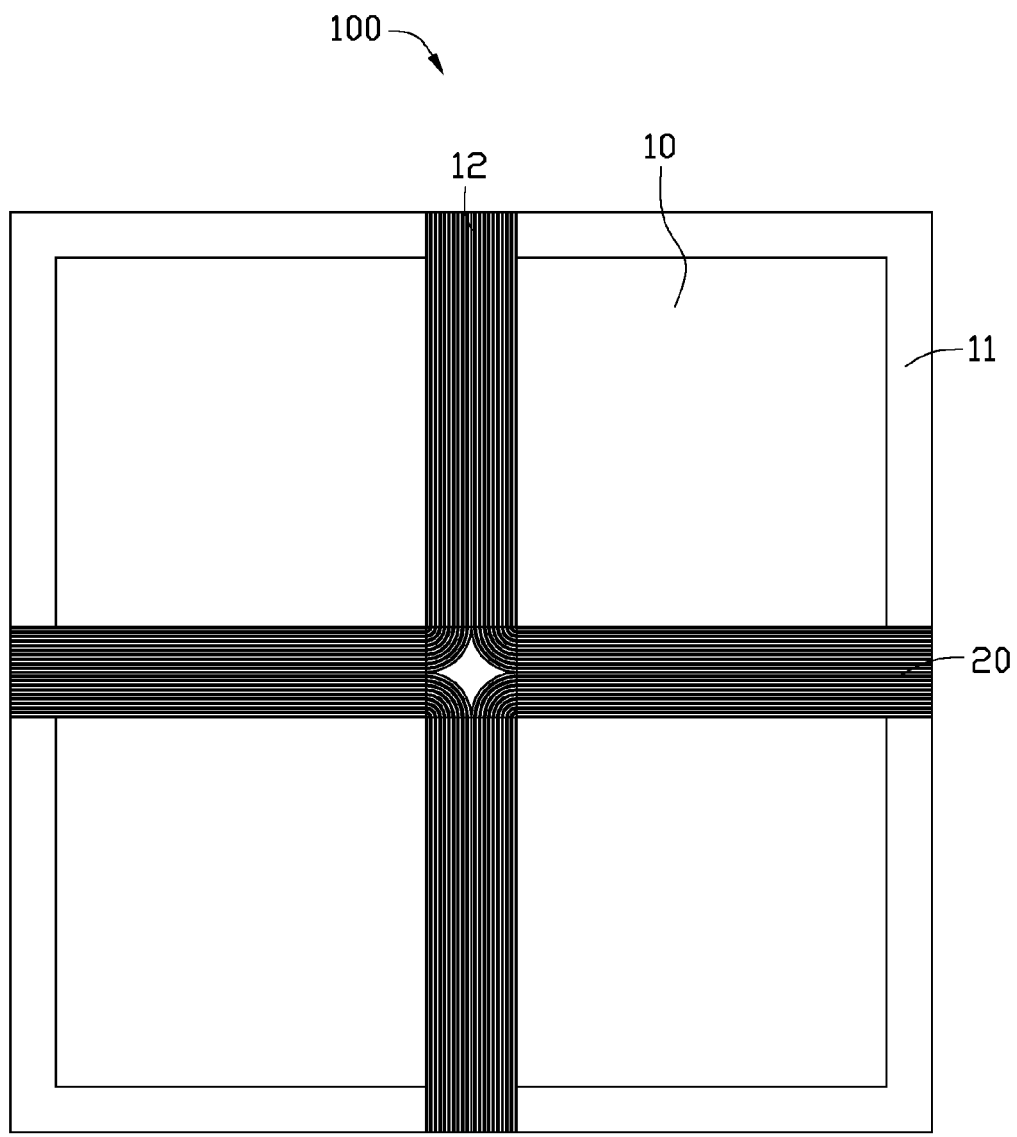
FIG. 1 is a top plan view of a display device with plural screens, in accordance with a first embodiment of the present disclosure.

Referring to FIG. 1, a display device with plural screens 100 in accordance with a first embodiment of the present disclosure is shown. The display device with plural screens 100 includes a plurality of display units 10 arranged in matrix, and a lens module 20.

Each display unit 10 includes a frame 11 located at an outer periphery thereof. The display units 10 are surrounded by the frame 11. In the present embodiment, the display device with plural screens 100 includes four display units 10 evenly arranged in two rows. A connecting portion 12 is formed between every two adjacent display units 10. The connecting portions 12 located at a crossing of the four adjacent display units 10 are substantially cruciform.

Figure 2:
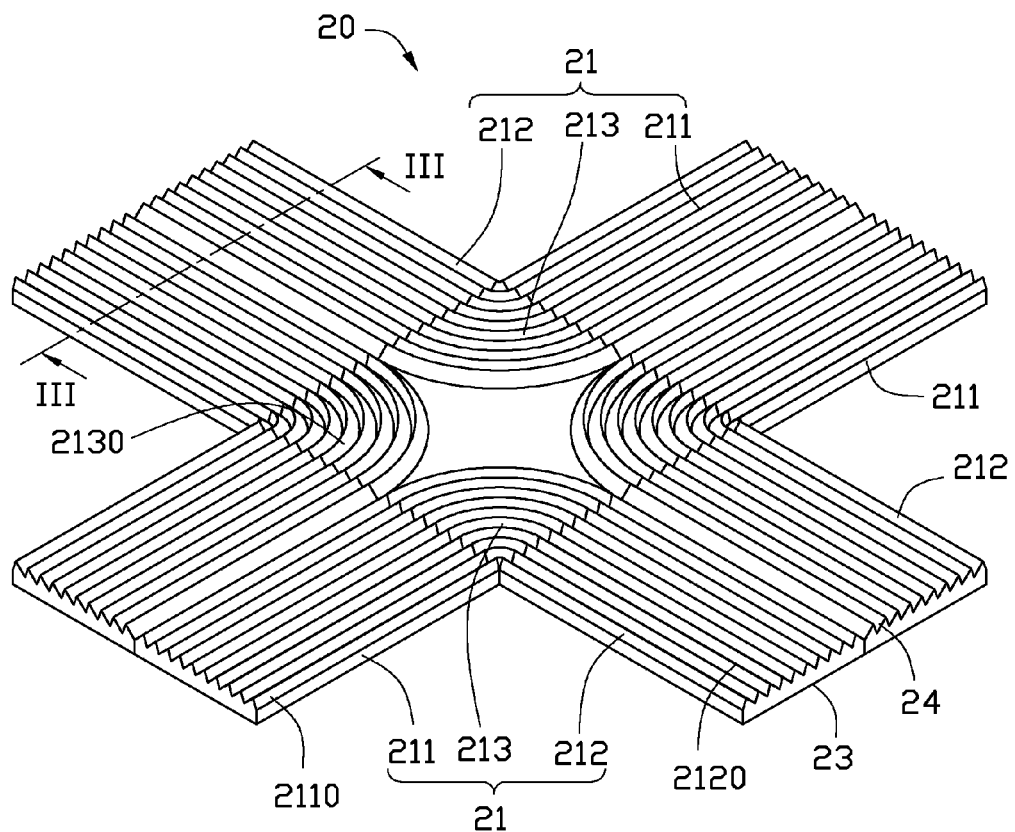
FIG. 2 is a schematic, isometric view of a lens module of the display device with plural screens of FIG. 1.
Figure 3:
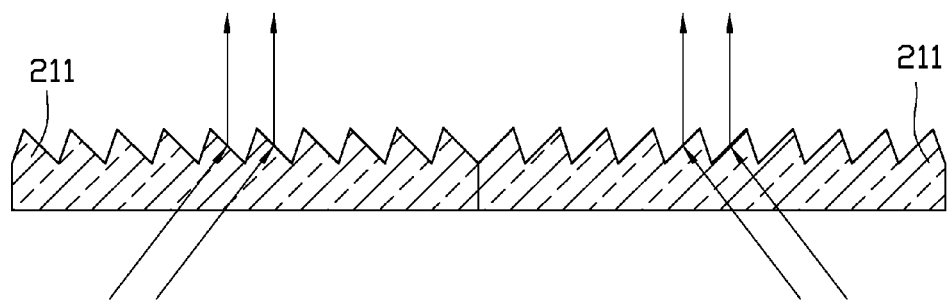
FIG. 3 is a cross-sectional view of the lens module of FIG. 2, taken along line III-III thereof

Referring to FIGS. 2 and 3 also, the lens module 20 is arranged on the connecting portion 12, and includes four lens units 21 arranged in cruciform. Each lens unit 21 includes a bottom surface 23 connected to the connecting portion 12 and a light output surface 24 opposite to the bottom surface 23. The bottom surface 23 is planar. Each lens unit 21 includes a first lens 211 covering a side wall of a display unit 10, a second lens 212 covering a side wall of an adjacent display unit 10, and a third lens 213 connected to the first lens 211 and the second lens 212. In the present embodiment, an extending direction of the first lens 211 is perpendicular to that of the second lens 212. The light output surface 24 of the first lens 211 has a plurality of first sawtooth protrusions 2110. The light output surface 24 of the second lens 212 has a plurality of second sawtooth protrusions 2120. The light output surface 24 of the third lens 213 has a plurality of third sawtooth protrusions 2130.

In the present embodiment, a shape of the first sawtooth protrusions 2110 of the first lens 211 is the same as the second sawtooth protrusions 2120. Two ends of the third sawtooth protrusions 2130 are respectively connected to the corresponding first sawtooth protrusions 2110 and the corresponding second sawtooth protrusions 2120. The first sawtooth protrusions 2110, the second sawtooth protrusions 2120, and the third sawtooth protrusions 2130 of each lens unit 21 are integrally formed as a single piece.

In the present embodiment, the first lens 211 of a lens unit 21 is connected to a first lens 211 of an adjacent lens unit 21, and the first sawtooth protrusions 2110 of the first lens 211 is symmetrical to the first sawtooth protrusions 2110 of the corresponding adjacent first lens 211. The second lens 212 of a lens unit 21 is connected to a second lens 212 of an adjacent lens unit 21, and the second sawtooth protrusions 2120 of the second lens 212 is symmetrical to the second sawtooth protrusions 2120 of the corresponding adjacent second lens 212. The four third lenses 213 of each lens module 20 are located at a crossing of the adjacent four connecting portions 12 of the corresponding display units 10.

Light beams emitted from the display units 10 reach the lens module 20, and refracted by the first sawtooth protrusions 2110, the second sawtooth protrusions 2120, and the third sawtooth protrusions 2130 to outside. Part of the refracted light beams emits to outside over the connecting portion 12; therefore, the frame 11 between every two adjacent display units 10 is disappeared when viewed from an outside environment, and pictures displayed by the display device 100 are continuous.

Figure 4:
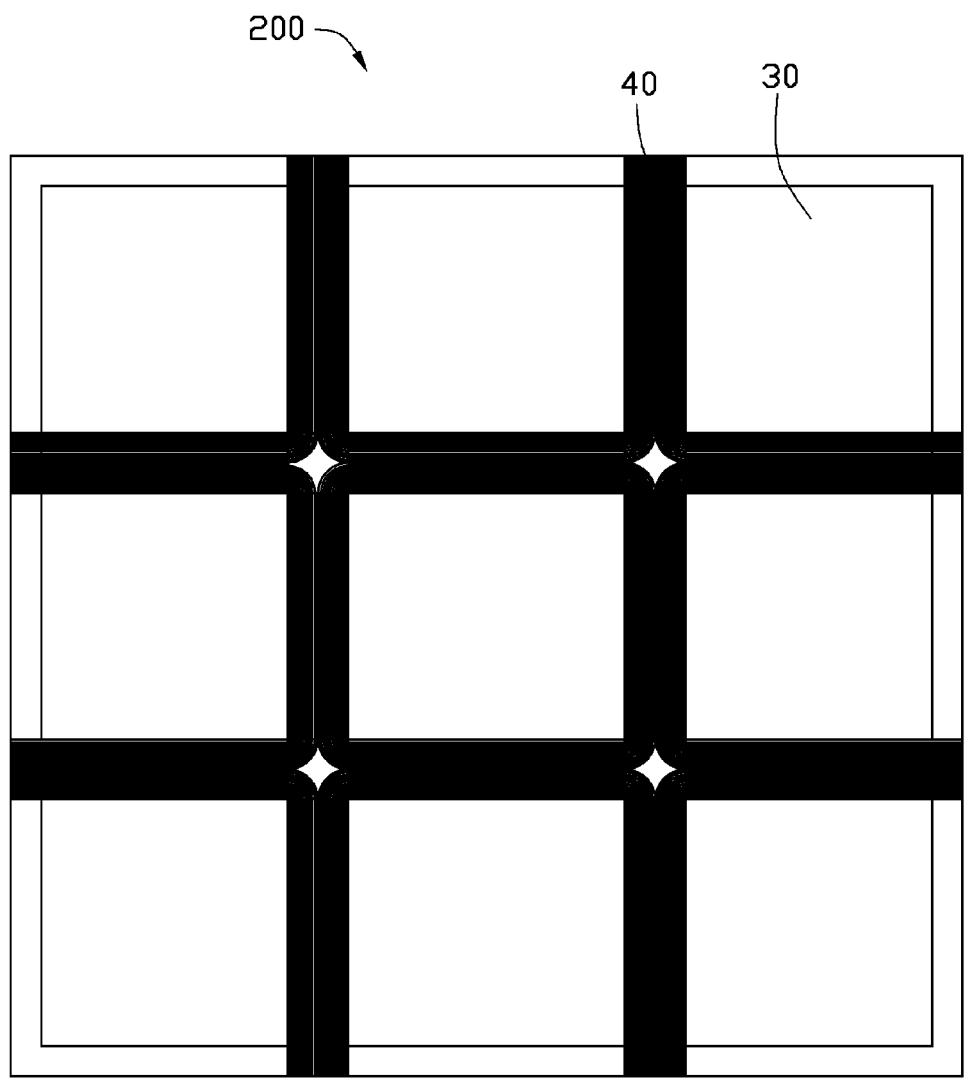
FIG. 4 is a top plan view of a display device with plural screens, in accordance with a second embodiment of the present disclosure.

Referring to FIG. 4, a display device with plural screens 200 in accordance with a second embodiment of the present disclosure is shown. The display device with plural screens 200 differing from the display device with plural screens 100 is that the display device with plural screens 200 including nine display units 30 and four lens modules 40. The nine display units 30 are arranged in 3 by 3 matrixs, and the four lens modules 40 respectively arranged on the corresponding frame of the display units 30.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A display device with plural screens, comprising:
a plurality of display units arranged in matrix, each display unit comprising a frame located at an outer periphery thereof, a plurality of connecting portions each being formed between every two adjacent display units, the connecting portions being substantially cruciform; and
at least one lens module arranged on the connecting portions, each lens module comprising four lens units arranged in cruciform, each lens unit comprising a bottom surface connected to the connecting portion and a light output surface opposite to the bottom surface, each lens unit comprising a first lens covering a side wall of a display unit, a second lens covering a side wall of an adjacent display unit, and a third lens connected to the first lens and the second lens, the light output surface of the first lens having a plurality of first sawtooth protrusions, the light output surface of the second lens having a plurality of second sawtooth protrusions, the light output surface of the third lens having a plurality of third sawtooth protrusions.

2. The display device with plural screens of claim 1, wherein a shape of the first sawtooth protrusions of the first lens is the same as the second sawtooth protrusions.

3. The display device with plural screens of claim 1, wherein the first sawtooth protrusions, the second sawtooth protrusions, and the third sawtooth protrusions of each lens unit are integrally formed as a single piece.

4. The display device with plural screens of claim 1, wherein two ends of the third sawtooth protrusions are respectively connected to the corresponding first sawtooth protrusions and the corresponding second sawtooth protrusions.

5. The display device with plural screens of claim 1, wherein an extending direction of the first lens is perpendicular to that of the second lens.

6. The display device with plural screens of claim 1, wherein the bottom surface of each lens module is planar.

7. The display device with plural screens of claim 1, wherein the first sawtooth protrusions of the first lens is symmetrical to the first sawtooth protrusions of the corresponding adjacent first lens.

8. The display device with plural screens of claim 1, wherein the second sawtooth protrusions of the second lens is symmetrical to the second sawtooth protrusions of the corresponding adjacent second lens.

9. The display device with plural screens of claim 1, wherein the four third lenses of the lens module are located at a crossing of the adjacent four connecting portions of the corresponding display units.

\* \* \* \* \*